(12) United States Patent
Choi et al.

(10) Patent No.: US 9,229,570 B2
(45) Date of Patent: Jan. 5, 2016

(54) DISPLAY DEVICE

(71) Applicants: Suk-Ho Choi, Yongin (KR); Jong-Hwan Kim, Yongin (KR); Joon-Sam Kim, Yongin (KR); Jun-Ho Kwack, Yongin (KR); Sang-Won Yeo, Yongin (KR)

(72) Inventors: Suk-Ho Choi, Yongin (KR); Jong-Hwan Kim, Yongin (KR); Joon-Sam Kim, Yongin (KR); Jun-Ho Kwack, Yongin (KR); Sang-Won Yeo, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 132 days.

(21) Appl. No.: 13/945,163

(22) Filed: Jul. 18, 2013

(65) Prior Publication Data

US 2014/0098055 A1  Apr. 10, 2014

(30) Foreign Application Priority Data

Oct. 8, 2012 (KR) .................. 10-2012-0111340

(51) Int. Cl.
*G06F 3/041* (2006.01)
*G06F 3/044* (2006.01)

(52) U.S. Cl.
CPC .............. *G06F 3/0416* (2013.01); *G06F 3/044* (2013.01); *G06F 3/0412* (2013.01); *G06F 2203/04103* (2013.01)

(58) Field of Classification Search
CPC ................. G06F 3/041; G06F 3/0412; G06F 2203/04103; G06F 2203/04111; G06F 3/0416; G06F 3/044

USPC ................................... 345/173, 174
See application file for complete search history.

(56) References Cited

U.S. PATENT DOCUMENTS

| | | | |
|---|---|---|---|
| 2011/0193817 A1* | 8/2011 | Byun et al. ..................... | 345/174 |
| 2012/0098736 A1* | 4/2012 | Yee .................. | 345/76 |
| 2012/0146919 A1* | 6/2012 | Kim et al. ..................... | 345/173 |
| 2013/0335368 A1* | 12/2013 | Lee .............................. | 345/174 |

FOREIGN PATENT DOCUMENTS

| | | | |
|---|---|---|---|
| KR | 10-2005-0038919 A | | 4/2005 |
| KR | 10-2005-0039237 A | | 4/2005 |
| KR | 10-2006-0050632 A | | 5/2006 |
| KR | 10-2008-0019897 A | | 3/2008 |

* cited by examiner

*Primary Examiner* — Regina Liang
(74) *Attorney, Agent, or Firm* — Lee & Morse, P.C.

(57) ABSTRACT

A display device includes a first substrate, a display section that is on the first substrate and that displays an image, first pad portions at a first directional edge of the first substrate and connected to the display section and to a driver integrated circuit (driver IC) that supplies a driving voltage, a second substrate on the first substrate with the display section interposed therebetween, and which exposes the first pad portions, a touch section that is on the second substrate and that corresponds to the display section, second pad portions on the second substrate and connected to edges of the touch section, a main flexible printed circuit board (main FPCB) connected to the first pad portions, and a touch flexible printed circuit board (touch FPCB) connected to the second pad portions and overlapping the main FPCB.

10 Claims, 4 Drawing Sheets

_US 9,229,570 B2_

DISPLAY DEVICE

CROSS-REFERENCE TO RELATED APPLICATION

This application claims priority under 35 U.S.C. §119 to Korean Patent Application No. 10-2012-0111340 filed in the Korean Intellectual Property Office on Oct. 8, 2012, the entire contents of which are incorporated herein by reference.

BACKGROUND

Among display panels, a panel employing On Cell Touch AMOLED (OCTA) may have a touch flexible printed Circuit board (touch FPCB) mounted thereon to drive a touch screen.

SUMMARY

Embodiments may be realized by providing a display device that includes a first substrate, a display section positioned on the first substrate and displaying an image, first pad portions positioned at a first directional edge of the first substrate, which are connected to the display section and a driver integrated circuit (driver IC) supplying a driving voltage, a second substrate positioned on the first substrate, with the display section interposed therebetween and exposing the first pad portions, a touch section positioned on the second substrate so as to correspond to the display section, second pad portions positioned on the second substrate and connected to the edges of the touch section, a main flexible printed circuit board (main FPCB) connected to the first pad portions, and a touch flexible printed circuit board (touch FPCB) connected to the second pad portions and overlapping the main FPCB.

A plurality of input signal wires for transmitting an input signal resulting from a first directional change in electrostatic capacitance may be formed on both sides in the first direction of the second substrate, and a plurality of second input signal wires for transmitting an input signal resulting from a second directional change may be formed on both sides of a second direction crossing the first direction of the second substrate.

The touch FPCB may be connected to the second pad portions by an anisotropic conductive film (ACF) at an edge of the second substrate. The anisotropic conductive film may be used to attach one edge of the second substrate and one edge of the touch FPCB at a melting temperature of about 165° C. to 175° C.

The touch FPCB may overlap the entire area of the driver IC. The touch FPCB may overlap some area including edges at one side of the driver IC. The touch FPCB may overlap some area including the center of the driver IC.

The touch section may include: first electrode pattern portions which are provided in plural form side by side in the first direction to sense a first directional change in electrostatic capacitance, and are connected to the first input signal wires; and second electrode pattern portions which are provided in plural form side by side in the second direction to sense a second directional change in electrostatic capacitance, and are connected to the second input signal wires.

The first electrode pattern portions and the second electrode pattern portions may be formed of a transparent electrode on an insulating layer, and the transparent electrode may be made of any one of ITO(Indium Tin Oxide), IZO(Indium Zinc Oxide), ITZO(Indium Tin Zinc Oxide), and ATO(Antimony Tin Oxide). The display section may include an organic light emitting element.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
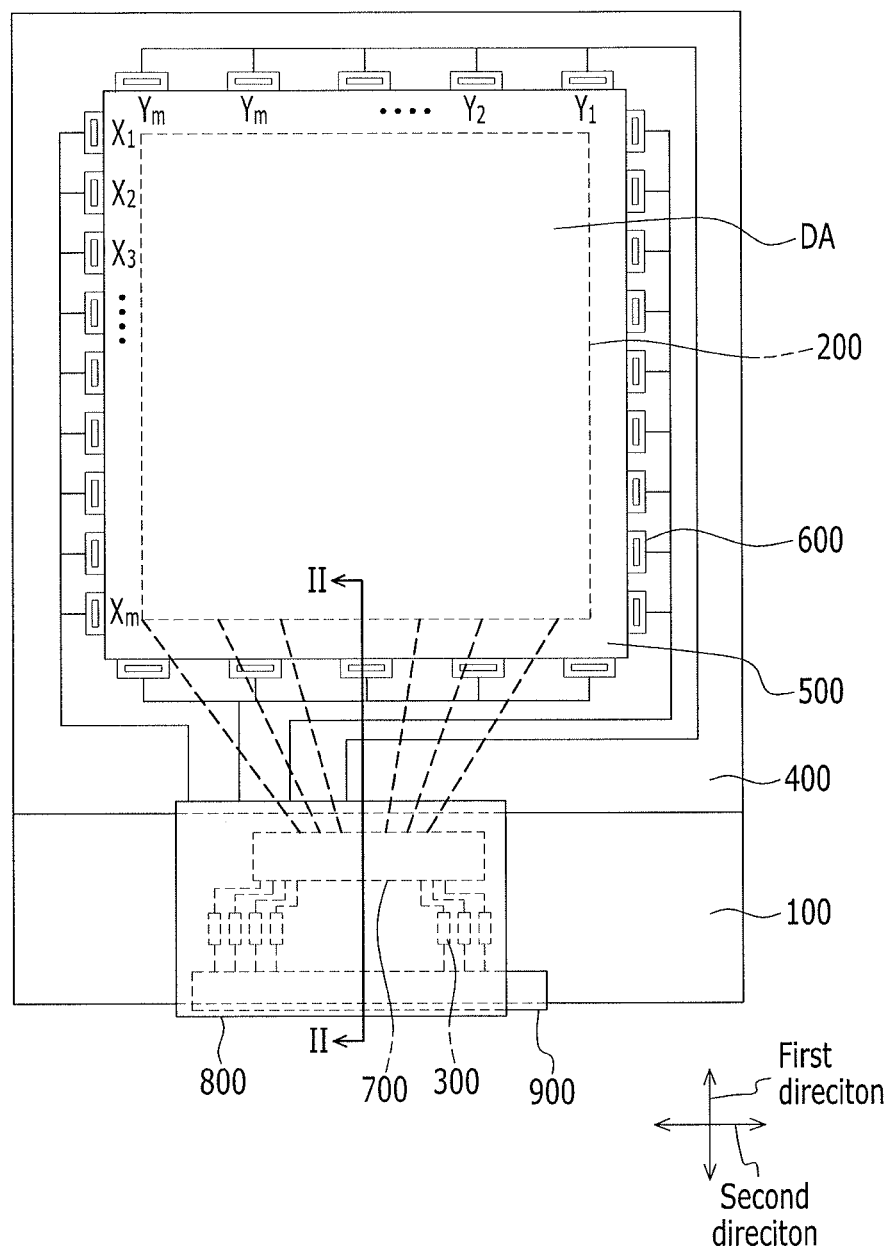
FIG. 1 is a top plan view schematically showing a display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

A first embodiment will be representatively described using the same reference numerals for elements having the same configuration in a variety of embodiments, and in the other embodiments, only the elements other than those of the first embodiment will be described.

It should be noted that the drawings are schematic and not to scale. The relative dimensions and ratios in the drawings are exaggerated or reduced for clarity and convenience. Of course, it is understood that these particular dimensions are merely illustrative and are in no way limiting. Identical or duplicate or equivalent or similar structures, elements, or parts that appear in two or more drawings are generally labeled with the same reference numeral to represent similar features. It will also be understood that when an element is referred to as being "on," "over," or "above" another element, it can be directly on, over, or above the other element, or intervening elements may also be present.

The exemplary embodiments described with reference to perspective views represent exemplary implementations. It will be expected that various modifications of the embodiments are possible. Therefore, the embodiments are not limited to specific forms of illustrated regions, and, for example, modifications of the forms due to manufacture may be possible.

Hereinafter, a display device according to a first exemplary embodiment will be described with reference to FIGS. 1 and 2.

FIG. 1 is a top plan view schematically showing a display device according to a first exemplary embodiment. FIG. 2 is a cross-sectional view taken along line II-II of the display device of FIG. 1 according to the first exemplary embodiment.

Figure 2:
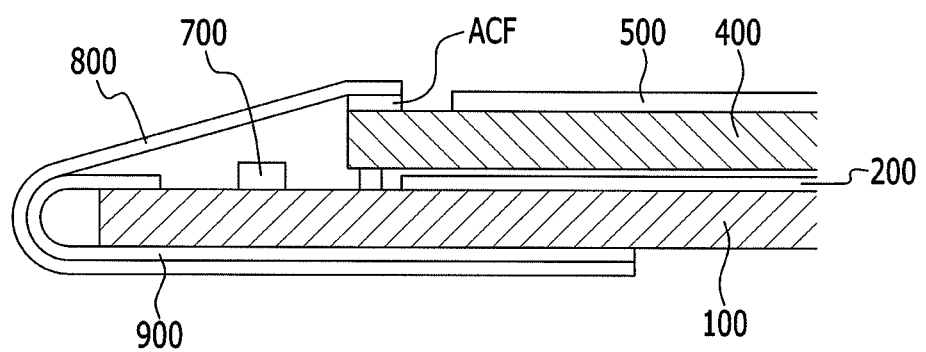
FIG. 2 is a cross-sectional view taken along line II-II of the display device of FIG. 1, according to an exemplary embodiment.

As shown in FIGS. 1 and 2, the display device may include a first substrate 100, a display section 200, first pad portions 300, a second substrate 400, a touch section 500, second pad portions 600, a main flexible printed circuit board (main FPCB) 900, and a touch flexible printed circuit board (touch FPCB) 800.

The first substrate 100 may be made of, e.g., an inorganic material such as glass, a metal material, or an organic material such as resin. The first substrate 100 can be either light-transmissive or light blocking, and can be flexible.

The display 200 is positioned on the first substrate 100, e.g., and under the second substrate 400. The display 200 displays an image through a plurality of pixels. A pixel refers to the smallest unit for displaying an image.

The first pad portions 300 are formed on the first substrate 100, and positioned at a first directional edge, e.g., adjacent a lateral side, of the first substrate 100. The first pad portions 300 may be adjacent to the display section 200, e.g., may be between an edge of the display section 200 and an edge of the first substrate 100 without being covered by the second substrate 400. The first pad portions 300 may be connected, e.g., electrically connected, to the display section 200. The first pad portions 300 may be attached to, e.g., to provide for an electrical connection with, a main flexible printed circuit board (main FPCB) 900.

A driving signal for driving the display section 200 may be supplied to the first pad portions 300 from an external source through the main FPCB, and the driving signal may be supplied to the display section 200 through the first pad portions 300. A driver integrated circuit (driver IC) 700 with a circuit chip mounted thereon may be positioned between the first pad portions 300 and the display section 200, and the driving signal supplied from the first pad portions 300.

The second substrate 400 may be positioned on the first substrate 100 so as to face the first substrate 100, with the display section 200 interposed between them. The second substrate 400 may be made of, e.g., an inorganic material such as glass, a metal material, or an organic material such as resin. The second substrate 400 can be either light-transmissive or light blocking, and can be flexible. The second substrate 400 is smaller in size than the first substrate 100, and may expose the first pad portions 300 formed on the first substrate 100.

The touch section 500 may be positioned on the second substrate 400 so as to correspond to the display section 200, e.g., may be positioned on a side of the second substrate 400 that is opposite the first substrate 100. The touch section 500 may be electrostatic capacitance type touch panel formed on the second substrate 400, and may have wires configured to sense a change in the electrostatic capacitance of an insulating layer by touching it. The shapes of a variety of wires and an insulating layer that constitute the touch section 500 may constitute wires and insulating layers that are in the related art, so a detailed description thereof will be omitted.

The second pad portions 600 may be formed on the second substrate 400. The second pad portions 600 may be connected, e.g., directly connected, to the edges of the touch section 500. The second pad portions 600 may be connected to the touch portion 500, and the second pad portions 600 may be attached to a flexible printed circuit board through the touch flexible printed circuit board (touch FPCB) 800. A sensing signal for sensing a touch on the touch portions 500 may be supplied to the second pad portions 600 from an external source through the touch FPCB 800, and the sensing signal may be supplied to the touch portions 500 through the second pad portions 600. The touch FPCB 800 connected to the second pad portions 600 may be connected to the main FPCB 900 attached to the first pad portions 300. The sensing signal refers to a signal supplied to the variety of wires constituting the touch section 500.

A plurality of input signal wires for transmitting an input signal resulting from a first directional change in electrostatic capacitance may be formed on both sides in the first direction of the second substrate 400. A plurality of second input signal wires for transmitting an input signal resulting from a second directional change may be formed on both sides of a second direction crossing the first direction of the second substrate 400.

The first input signal wires may be connected to the second pad portions 600, e.g., connected to first directional edges of the touch section 500 on the second substrate 400, and the first input signal wires may be connected to the touch FPCB 800 positioned at an edge of the second substrate 400. The second input signal wires may be connected to the second pad portions 600, e.g., connected to second directional edges of the touch section 500 on the second substrate 400, and the second input signal wires may be connected to the touch FPCB 800 positioned at the edge of the second substrate 400.

The first input signal wires and the second input signal wires may be respectively connected to first electrode pattern portions (not shown) and second electrode pattern portions (not shown) through the first pad portions 300 and the second pad portions 600. The first electrode pattern portions and the second electrode pattern portions may be formed within the touch section 500. The first electrode pattern portions may be provided in plural form side by side in the first direction to sense a first directional change in electrostatic capacitance, and are connected to the first input signal wires. The second electrode pattern portions may be provided in plural form side by side in the second direction to sense a second directional change in electrostatic capacitance, and may be connected to the second input signal wires. The first electrode pattern portions and the second electrode pattern portions may be formed of a transparent electrode on an insulating layer, and the transparent electrode may be made of any one of, or at least one selected from the group of, ITO (Indium Tin Oxide), IZO (Indium Zinc Oxide), ITZO (Indium Tin Zinc Oxide), and ATO (Antimony Tin Oxide).

As shown in FIG. 1, the display device may have a structure in which the touch FPCB 800 attached to the edge of the second substrate 400 overlaps the entire area of the driver IC 700 positioned at an edge of the first substrate 100. With the structure in which the touch FPCB 800 and the driver IC 700 are separated from each other by a given distance and do not overlap each other, the pressing area of the touch FPCB 800 is narrow and biased to one side of the second substrate 400. Thus, making it difficult to provide a plurality of touch sensor pads for double routing. On the other hand, according to exemplary embodiments, an overlapping structure of the touch FPCB 800 and the driver IC 700 is employed to widen the pressing area of the touch FPCB 800 and provide a plurality of touch sensor pads 600, thereby achieving double routing.

The touch FPCB 800 may be attached and connected to the second pad portions 600 by an anisotropic conductive film (ACF) at an edge of the second substrate 400. Due to the overlapping structure of the touch FPCB 800 and the driver IC 700, heat generated from the touch FPCB 800 may cause thermal damage to the driver IC 700. Accordingly, coupling of the touch FPCB 800 and an edge of the second substrate 400 by the anisotropic conductive film occurs, e.g., may be performed, at a low temperature. For example, the anisotropic conductive film has a melting temperature of about 165° C. to about 175° C., which may be controlled so that one edge of the second substrate 400 and one edge of the touch FPCB 800 are attached together. If the process is performed at a low temperature for attachment of the anisotropic conductive film, the temperature transferred from the touch FPCB 800 to the driver IC 700 becomes lower than the melting temperature of the anisotropic conductive film.

According to an exemplary embodiment, after pressing the touch FPCB 800 on the driver IC 700 at 170° C. so as to fully overlap it, as stated above, the temperature transferred from the touch FPCB 800 to the driver IC 700 was measured. For example, the rise in temperature with respect to the driver IC 700 may be measured.

In an example, the measurement result showed that the temperature transferred to the driver IC 700 was about 94.1° C. The transferred temperature was measured at a central region of the driver IC 700. A simulation result of double routing showed that the touch charge time was about 2.03 μs. On the other hand, after pressing the touch FPCB 800 on the driver IC 700 at a higher temperature, e.g., 200° C., so as to fully overlap it, the temperature transferred from the touch FPCB 800 to the driver IC 700 was measured. The measurement result showed that the temperature transferred to the driver IC 700 was about 118.7° C. A simulation result of single routing showed that the touch charge time was about 5.12 μs.

As can be seen from the above test results, in the overlapping structure of the touch FPCB 800 on the driver IC 700, the temperature transferred to the driver IC 700, obtained when a conventional high-temperature anisotropic conductive film (process temperature: 200° C.) is used for a touch FOG, e.g., a touch Film on Glass pressing area, is higher by 24.6° C. than that obtained when a low-temperature anisotropic conductive film (process temperature: 200° C.) is used for touch FOG. A low transfer temperature involves minimizing thermal damage to a COG pressing part. Further, as can be seen from the above test results, the charge time in the double routing method is shorter than the charge time in the single routing method by more than half. That is, to use the double routing method, the touch FPCB 800 may overlap the driver IC 700, and by way of the overlapping relationship the low-temperature FOG anisotropic conductive film may be used.

Figure 3:
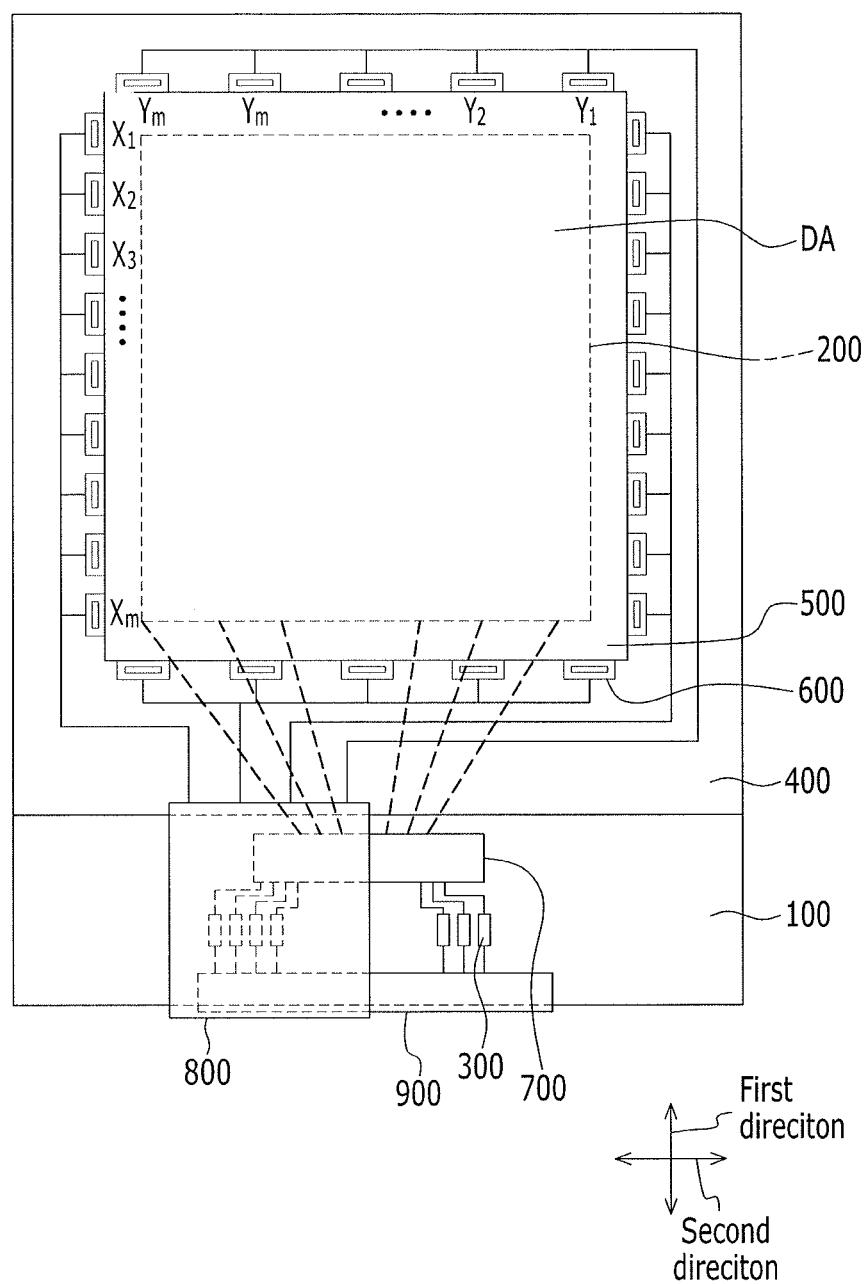
FIG. 3 is a top plan view schematically showing a display device according to an exemplary embodiment.
Figure 4:
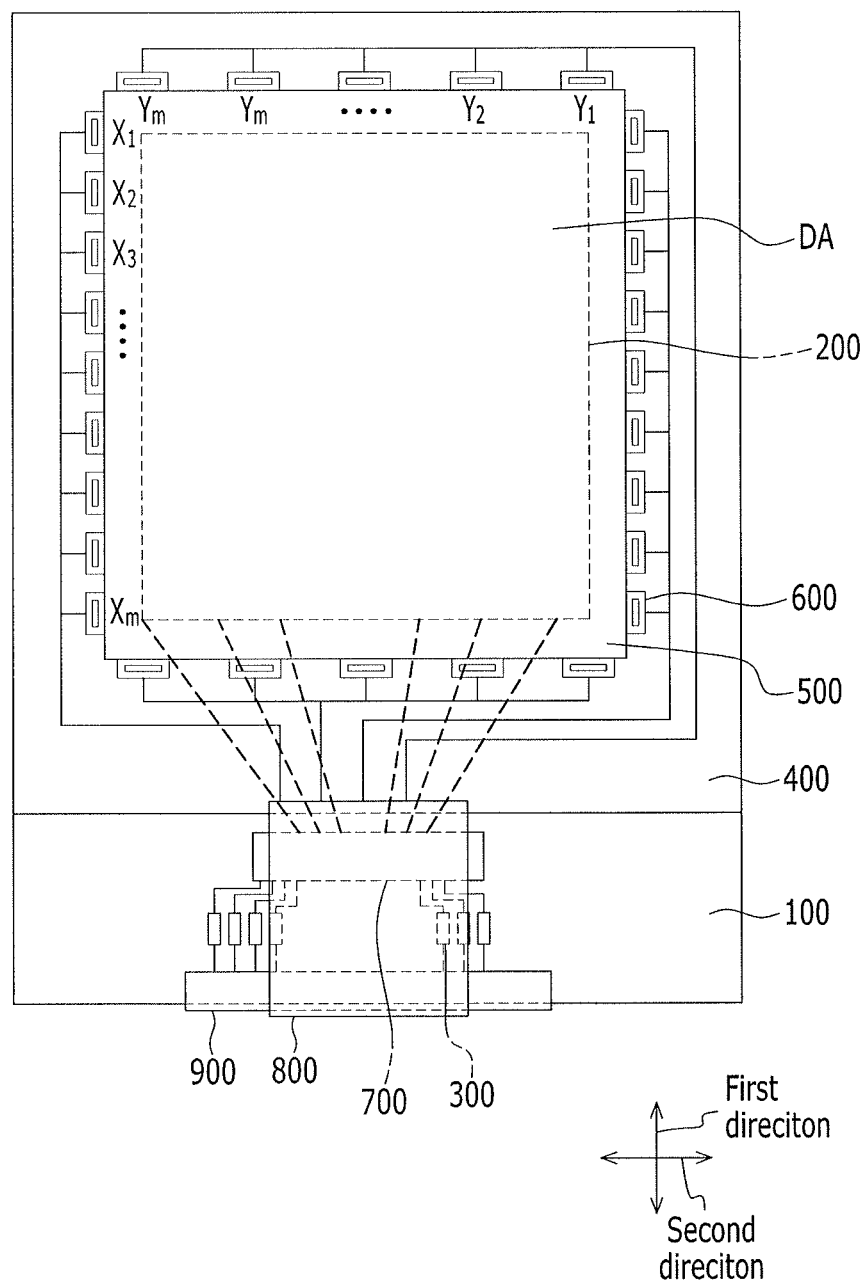
FIG. 4 is a top plan view schematically showing a display device according to an exemplary embodiment.

FIG. 3 is a top plan view schematically showing a display device according to a second exemplary embodiment. FIG. 4 is a top plan view schematically showing a display device according to a third exemplary embodiment.

As shown in FIG. 3, the touch FPCB 800 may be configured to overlap some area including edges at one side of the driver IC 700, e.g., the touch FPCB 800 may overlap only one side of the driver IC 700 while in a non-overlapping relationship with the opposite side of the driver IC 700. Further, the exemplary embodiment may also additionally include the structure of the first exemplary embodiment, e.g., in which the touch FPCB 800 fully overlaps the entire area of the driver IC 700 on top of the driver IC 700.

As shown in FIG. 4, the touch FPCB 800 may be configured to overlap some area including the center of the driver IC 700, e.g., the touch FPCB 800 may overlap only the center of the driver IC 700 while in a non-overlapping relationship with both opposite ends of the driver IC 700. Further, the exemplary embodiment may also additionally include the structure of the first exemplary embodiment, e.g., in which the touch FPCB 800 fully overlaps the entire area of the driver IC 700 on top of the driver IC 700.

The exemplary embodiments shown in FIG. 3 and FIG. 4 may have the same structure except that they are slightly different in the overlapping area of the touch FPCB 800 and the driver IC 700 and the position of the touch FPCB 800, so descriptions thereof will be omitted.

The display device according to the exemplary embodiments may be an organic light emitting display device including an organic light emitting diode OLED. However, embodiments are not limited thereto, e.g., the display section 200 may be a liquid crystal display LCD including liquid crystals or the display section 200 may be a plasma display panel including plasma.

In this way, in the display device according to the exemplary embodiments, the touch FPCB 800 and the driver IC 700 overlap each other in a touch FOG pressing area. Thus, the mounting area of the touch FPCB 800 may be expanded, thereby achieving double routing and improving touch driving characteristics. Further, a low-temperature FOG anisotropic conductive film may be used to attach the touch FPCB 800 to a substrate to thereby reduce thermal damage of the COG part and failure of the display device.

By way of summation and review, a touch panel display employing On Cell Touch AMOLED (OCTA) may have the touch flexible printed Circuit board (touch FPCB) mounted thereon to driver a touch screen, and the touch FPCB may be in a non-overlapping relationship with a driver integrated circuit (driver IC). In this regard, the touch FPCB and the driver IC may not overlap each other and may be separated by a given distance. This is because, e.g., if a touch film on glass (TFOG) process is performed when the touch FPCB overlaps on the driver IC, a Chip-on-Glass (COG) part may be thermally damaged and may cause a failure.

Further, to provide faster touch response speed in a touch panel display, a double routing method, rather than a single routing method, may be used. However, the pressing area of the touch FPCB may be narrow because the touch FPCB and the driver IC should be kept at a given distance from each other. This may make it impossible to provide a plurality of pressure pads for double routing. For example, in the single routing method, the number of touch sensor pads sought for touch recognition is $X_1+X_2+ \ldots +X_n+Y_1+Y_2+ \ldots +Y_m$, which is equal to $2(n+m)$. Accordingly, $2(n+m)$ touch sensor pads may be used the double routing method, which is not available for the design of display devices using the single routing method.

In view of the above, embodiments relate to a display device that has an improved structure for connecting a flexible printed circuit board to a touch panel. In this regard, embodiments relate to providing a display device, e.g., a touch panel organic light emitting display device, which reduces the possibility of and/or prevents thermal damage of a COG part and reduces device failure by configuring a touch FPCB to overlap a driver IC by the use of a low-temperature FOG anisotropic conductive film (ACF), and improves touch performance by providing a design for ensuring enough touch Film-on-Glass (TFOG) pads are provided to enable double routing.

Further, in exemplary embodiments, the touch FPCB and the driver IC overlap each other in the area of a TFOG pressing area. Thus, the mounting area of the touch FPCB is expanded, thereby achieving double routing and improving touch driving characteristics. Also, a low-temperature anisotropic conductive film may be used to attach the touch FPCB to a substrate to thereby reduce thermal damage of the COG part and failure of the display device.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:
1. A display device, comprising:
a first substrate;
a display section that is on the first substrate and that displays an image;

first pad portions at a first directional edge of the first substrate, and connected to the display section and to a driver integrated circuit (driver IC) that supplies a driving voltage;

a second substrate on the first substrate with the display section interposed therebetween, the second substrate exposing the first pad portions;

a touch section that is on the second substrate and that corresponds to the display section;

second pad portions on the second substrate and connected to edges of the touch section;

a main flexible printed circuit board (main FPCB) connected to the first pad portions; and a touch flexible printed circuit board (touch FPCB) connected to the second pad portions and overlapping the main FPCB, the touch FPCB covering at least a portion of the driver IC to achieve double routing.

2. The display device of claim 1, wherein:

a plurality of input signal wires that transmit an input signal resulting from a first directional change in electrostatic capacitance are on opposite sides in a first direction of the second substrate, and a plurality of second input signal wires that transmit an input signal resulting from a second directional change are on opposite sides in a second direction, which crosses the first direction, of the second substrate.

3. The display device of claim 2, wherein the touch section includes:

first electrode pattern portions that are provided in plural form side by side in the first direction to sense a first directional change in electrostatic capacitance, and are connected to the first input signal wires, and second electrode pattern portions that are provided in plural form side by side in the second direction to sense a second directional change in electrostatic capacitance, and are connected to the second input signal wires.

4. The display device of claim 3, wherein the first electrode pattern portions and the second electrode pattern portions are formed of a transparent electrode on an insulating layer, and the transparent electrode includes at least one of indium tin oxide, indium zinc oxide, indium tin zinc oxide, and antimony tin oxide.

5. The display device of claim 1, wherein the touch FPCB is connected to the second pad portions by an anisotropic conductive film at an edge of the second substrate.

6. The display device of claim 1, wherein the touch FPCB covers an entirety of the driver IC.

7. The display device of claim 1, wherein the touch FPCB covers a partial area of the driver IC that includes edges along one side of the driver IC.

8. The display device of claim 1, wherein the touch FPCB covers a partial area of the driver IC that includes a center of the driver IC.

9. The display device of claim 1, wherein the display section includes an organic light emitting element.

10. A display device, comprising:

a first substrate;

a display section that is on the first substrate and that displays an image;

first pad portions at a first directional edge of the first substrate, and connected to the display section and to a driver integrated circuit (driver IC) that supplies a driving voltage;

a second substrate on the first substrate with the display section interposed therebetween, the second substrate exposing the first pad portions;

a touch section that is on the second substrate and that corresponds to the display section;

second pad portions on the second substrate and connected to edges of the touch section;

a main flexible printed circuit board (main FPCB) connected to the first pad portions; and a touch flexible printed circuit board (touch FPCB) connected to the second pad portions and overlapping the main FPCB, wherein the touch FPCB covers at least a portion of the driver IC to achieve double routing and is connected to the second pad portions by an anisotropic conductive film at an edge of the second substrate, and the anisotropic conductive film attaches one edge of the second substrate and one edge of the touch FPCB at a melting temperature of about 165° C. to about 175° C.

* * * * *